(12) United States Patent
Izaki et al.

(10) Patent No.: US 10,915,051 B2
(45) Date of Patent: Feb. 9, 2021

(54) IMAGE FORMING APPARATUS

(71) Applicant: CANON KABUSHIKI KAISHA, Tokyo (JP)

(72) Inventors: Takao Izaki, Suntou-gun (JP); Yasuhiro Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/676,899

(22) Filed: Nov. 7, 2019

(65) Prior Publication Data
US 2020/0150573 A1 May 14, 2020

(30) Foreign Application Priority Data

Nov. 8, 2018 (JP) .................... 2018-210677

(51) Int. Cl.
| | | |
|---|---|---|
| G03G 15/00 | (2006.01) | |
| G03G 15/20 | (2006.01) | |
| H05B 3/00 | (2006.01) | |
| H05B 1/02 | (2006.01) | |

(52) U.S. Cl.
CPC ..... *G03G 15/5004* (2013.01); *G03G 15/2053* (2013.01); *H05B 1/0241* (2013.01); *H05B 3/0095* (2013.01)

(58) Field of Classification Search
CPC .......... G03G 15/5004; G03G 15/2053; H05B 1/0241; H05B 3/0095
See application file for complete search history.

(56) References Cited

U.S. PATENT DOCUMENTS

| | | | |
|---|---|---|---|
| 2009/0003868 A1 | 1/2009 | Namiki et al. | |
| 2013/0236204 A1* | 9/2013 | Yamaguchi ............ | G03G 15/80 399/88 |
| 2013/0236206 A1* | 9/2013 | Shoji ................. | H02M 3/33507 399/88 |
| 2013/0266334 A1 | 10/2013 | Shimura et al. | |
| 2015/0016152 A1* | 1/2015 | Kojima ............. | H02M 3/33569 363/21.02 |
| 2015/0139678 A1 | 5/2015 | Shimura | |
| 2019/0020268 A1* | 1/2019 | Saito ........................ | H02H 7/20 |

FOREIGN PATENT DOCUMENTS

| | | |
|---|---|---|
| JP | 2007-114416 A | 5/2007 |
| JP | 3919670 B2 | 5/2007 |

\* cited by examiner

*Primary Examiner* — Francis C Gray
(74) *Attorney, Agent, or Firm* — Venable LLP (57) ABSTRACT

The image forming apparatus is characterized in that information about an input voltage detected on the primary side of a transformer is transmitted from a primary-side switching control unit to a secondary-side controller for controlling a heating device, and the controller controls the temperature of a heater of the heating device based on the transmitted information.

17 Claims, 6 Drawing Sheets

FIG. 6

IMAGE FORMING APPARATUS

BACKGROUND OF THE INVENTION

Field of the Invention

The present invention relates to image forming apparatuses including a switching power supply device and an image heating device.

Description of the Related Art

In an image forming apparatus including a switching power supply device and an image heating device, the current supplied from a commercial AC power source to the image forming apparatus is restricted to be less than or equal to a predetermined current value (e.g.,15 Amps or less). For raising the temperature of the image heating device, the maximum power suppliable to the image heating device is calculated to control the power supplied to the image heating device so as not to exceed the maximum power. Known techniques for restricting the current from a commercial AC power source include Japanese Patent Application Laid-Open No. 2007-114416 and Japanese Patent No. 3919670.

Conventional methods of calculating the maximum power suppliable to the image heating device, however, require adding a current detection circuit or a voltage detection circuit for calculating the maximum power suppliable to the image heating device. This unfortunately increases the cost of the image forming apparatus.

SUMMARY OF THE INVENTION

One aspect of embodiments of the present invention is an image forming apparatus that can calculate the maximum power suppliable to an image heating device.

Another aspect of the embodiments of the present invention is an image forming apparatus including a power supply device, the image forming apparatus including an image forming unit configured to form an image on a recording material, a fixing device including a heater to which power is supplied from an AC power source to generate heat, the fixing device configured to heat the recording material to fix the image onto the recording material, a second control unit configured to control a temperature of the heater, and a transmission unit configured to transmit information from the power supply device to the second control unit, wherein the power supply device includes a rectifying and smoothing unit configured to rectify and smooth an AC voltage from the AC power source to generate an input voltage, a transformer including a primary winding, a secondary winding, and an auxiliary winding, a switching unit connected to the primary winding of the transformer, the primary winding configured to receive the input voltage, a feedback unit configured to output a feedback voltage according to an output voltage induced in the secondary winding of the transformer, a voltage detection unit configured to detect a voltage generated in the auxiliary winding, a current detection unit configured to detect a current flowing in the switching unit, and a first control unit configured to control switching of the switching unit based on the feedback voltage, wherein the first control unit transmits, to the second control unit through the transmission unit, information about a maximum of a power value suppliable to the heater, determined based on the current detected by the current detection unit and the voltage detected by the voltage detection unit, and wherein the second control unit controls power supply to the heater according to the information about the maximum acquired through the transmission unit.

A further aspect of the embodiments of the present invention is an image forming apparatus including a power supply device configured to supply power to a load, the image forming apparatus including an image forming unit configured to form an image on a recording material, a fixing device including a heater to which power is supplied from an AC power source to generate heat, the fixing device configured to heat the recording material to fix the image onto the recording material, a second control unit configured to control a temperature of the heater, and a transmission unit configured to transmit information from the power supply device to the second control unit, wherein the power supply device includes a rectifying and smoothing unit configured to rectify and smooth an AC voltage from the AC power source to generate an input voltage, a transformer including a primary winding, a secondary winding, and an auxiliary winding, a switching unit connected to the primary winding of the transformer, the primary winding configured to receive the input voltage, a feedback unit configured to output a feedback voltage according to an output voltage induced in the secondary winding of the transformer, a voltage detection unit configured to detect a voltage generated in the auxiliary winding, a first control unit configured to control switching of the switching unit based on the feedback voltage, wherein the first control unit transmits information about the voltage detected by the voltage detection unit to the second control unit through the transmission unit, and wherein the second control unit determines information about a maximum of the power value suppliable to the heater based on the information about the voltage acquired through the transmission unit, and controls power supply to the heater according to the information about the maximum value of the power value suppliable to the heater.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Configuration of Image Forming Apparatus]

Figure 1:
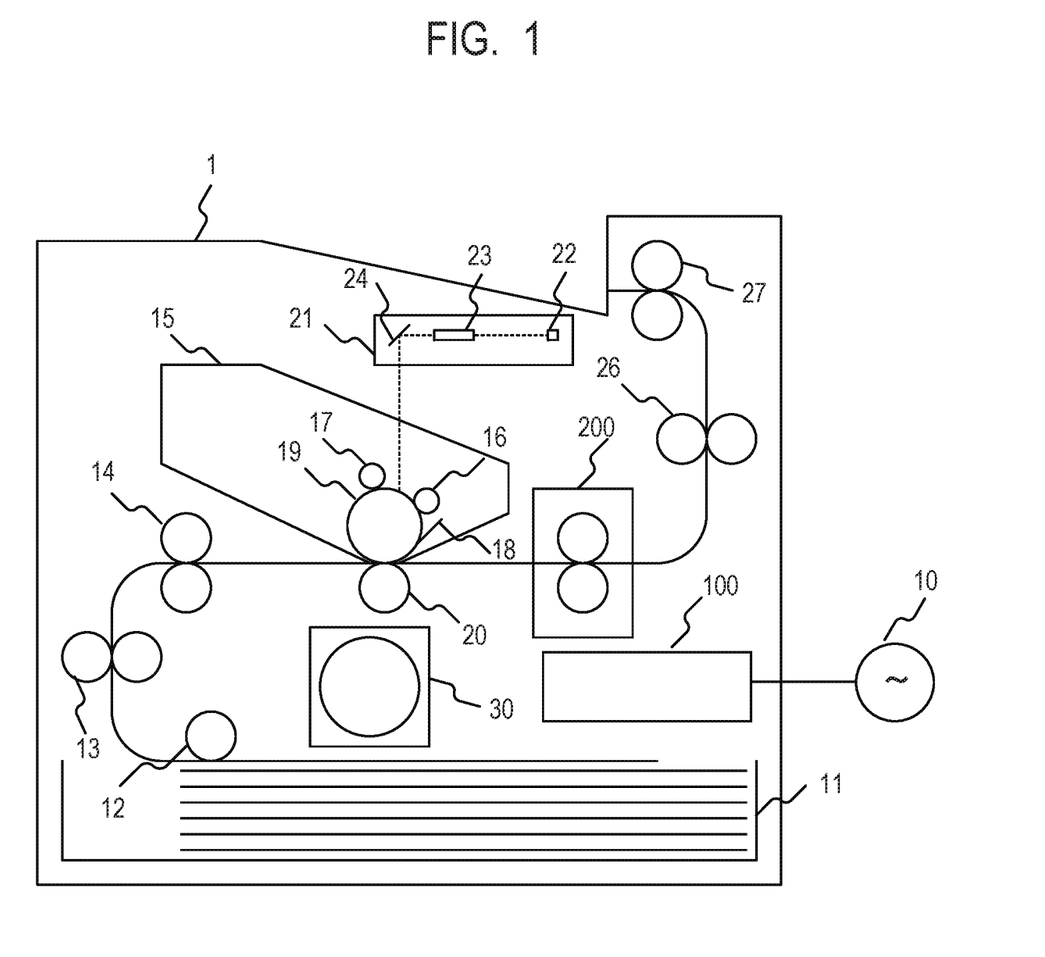
FIG. 1 is a schematic sectional view illustrating the configuration of an image forming apparatus in first, second and third embodiments.

FIG. 1 is a schematic sectional view illustrating the configuration of an image forming apparatus 1, which employs an electrophotographic recording technique and to which a power supply device to be described below can be applied. An integrally formed detachable process cartridge 15 (an image forming unit) includes a charge roller 16, a development roller 17, a cleaner 18, and a photoconductive drum 19 (an electrophotographic photosensitive member). The surface of the photoconductive drum 19 is uniformly charged by the charge roller 16 and exposed by a scanner unit 21 according to an image signal, resulting in an electrostatic latent image formed on the photoconductive drum 19. Laser light emitted from a laser diode 22 in the scanner unit 21 scans the surface of the photoconductive drum 19 through a rotating polygon mirror 23 and a reflecting mirror 24 to form the electrostatic latent image on the surface of the photoconductive drum 19. The electrostatic latent image on the photoconductive drum 19 is visualized by the development roller 17 as a toner image.

Recording materials stacked in a paper feed cassette 11 are fed by a pickup roller 12 one by one from the paper feed cassette 11 and conveyed to registration rollers 14 by paper feed rollers 13. The registration rollers 14 convey each recording material to a transfer roller 20 with predetermined timing. The toner image on the photoconductive drum 19 is transferred by the transfer roller 20 onto the recording material. The recording material with the toner image transferred thereon is conveyed to a fixing device 200. The fixing device 200 (an image heating device) subjects the recording material to heating processing and pressurization processing, so that the unfixed toner image on the recording material is fixed onto the recording material. The recording material with the toner image fixed thereon is ejected by intermediate ejection rollers 26 and ejection rollers 27 to the outside of the image forming apparatus 1; the series of print operations is thus finished. A motor 30 supplies driving forces to each of the units in the image forming apparatus 1, including the fixing device 200.

In the fixing device 200, power supplied from an AC power source 10 to the fixing device 200 is controlled by turning on and off a semiconductor switch such as a bidirectional thyristor (hereinafter referred to as a triac) based on a zero-crossing point as a zero-crossing timing at which the input AC voltage to be described below becomes zero. The supplied power is controlled by a secondary-side control unit 220 to be described below (see FIG. 2). The secondary-side control unit 220 includes ROM and RAM (not shown). By executing programs stored in the ROM while using the RAM as a work area, the secondary-side control unit 220 controls power supply to bring the temperature of the fixing device to a target temperature. The secondary-side control unit 220 also includes a timer for measuring time.

A power supply device 100, which is a power supply device included in the image forming apparatus 1, is connected to the AC power source 10 (an external power source) through a power cable. An AC voltage is input to the power supply device 100 from the AC power source 10. The power supply device 100 supplies power to the motor 30 (a driving unit) and other units, which are loads in the image forming apparatus 1.

[Configuration of Power Supply Device]

Figure 2:
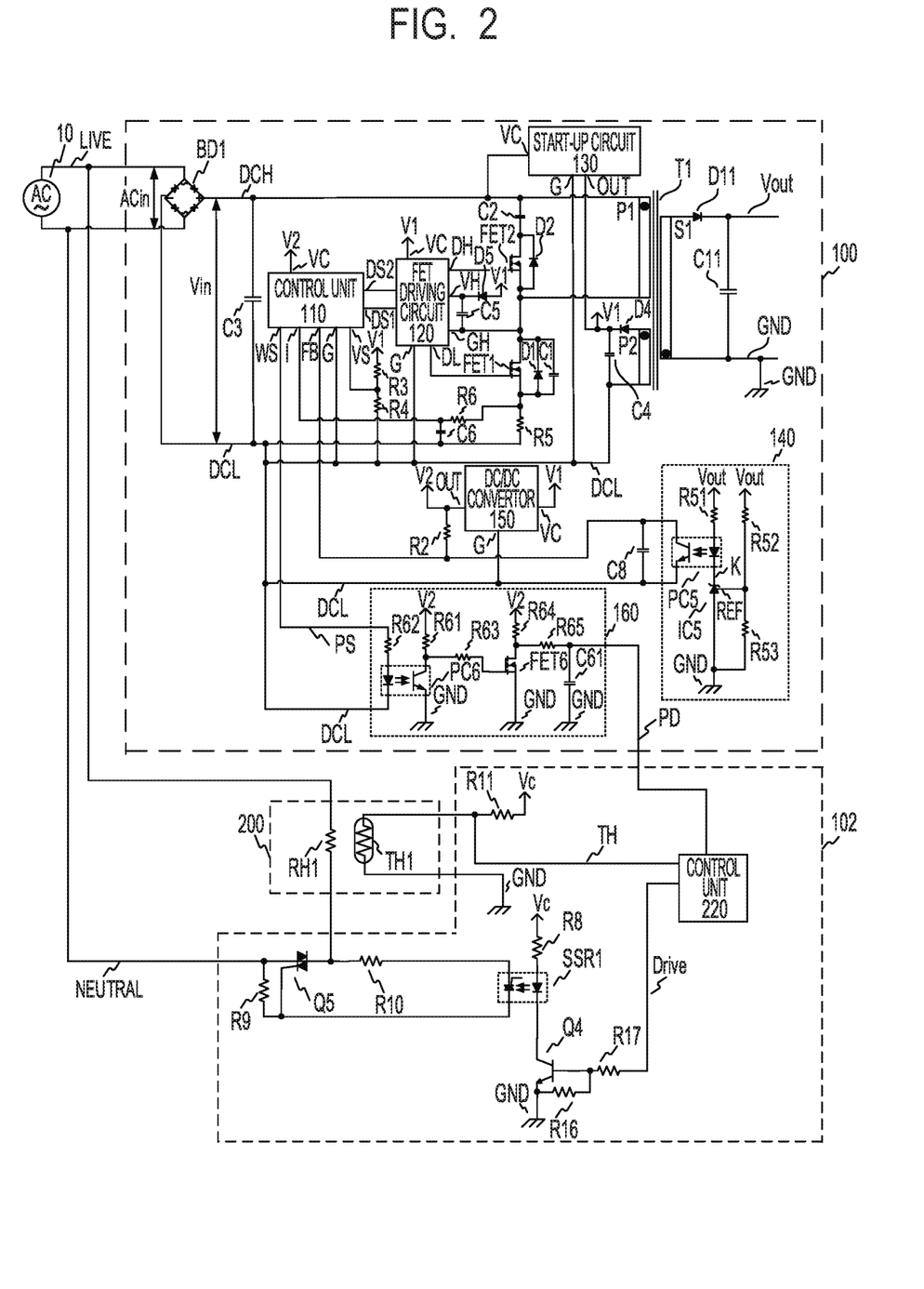
FIG. 2 is a circuit diagram illustrating the circuit configuration in the first embodiment, including a switching power supply device, a fixing control circuit, and a fixing device.

FIG. 2 is a circuit diagram illustrating the configuration in this embodiment including: the power supply device 100 (hereinafter referred to as a switching power supply device 100) that is an active-clamp switching power supply device; the fixing device 200; and a fixing control circuit 102 that controls the fixing device 200 of the image forming apparatus 1. In FIG. 2, an AC voltage from the AC power source 10 (a commercial AC power source) is rectified by a bridge diode BD1 (a full-wave rectification unit) and accumulated in a smoothing capacitor C3 (a smoothing unit) to generate an input voltage Vin. DCL and DCH indicate the lower-potential side and the higher-potential side of the smoothing capacitor C3, respectively. The switching power supply device 100 in this embodiment is an insulating DC/DC converter, in which the input voltage Vin accumulated in the smoothing capacitor C3 is output as an output voltage Vout (DC 24 V in this embodiment) to the secondary side through an insulating transformer T1.

The switching power supply device 100 includes the insulating transformer T1, which includes a primary winding P1 and an auxiliary winding P2 on the primary side and a secondary winding S1 on the secondary side. Energy is supplied from the primary winding P1 to the secondary winding S1 of the transformer T1 with switching operations of a field-effect transistor (hereinafter denoted as FET) 1 (a first switching element) and an FET2 (a second switching element) to be described below. A forward voltage of the input voltage Vin applied to the primary winding P1 is induced in the auxiliary winding P2 of the transformer T1. The induced forward voltage is rectified and smoothed by a diode D4 and a capacitor C4 and supplied as a power supply voltage V1. A resistor R5 is a current detection resistor for detecting the current flowing between the drain terminal and the source terminal of the FET1.

The primary side of the transformer T1 of the switching power supply device 100 includes the FET1 connected in series with the primary winding P1 of the transformer T1. The primary side of the transformer T1 also includes a circuit that includes a capacitor C2 for voltage clamping and the FET2 connected in series with each other, and this circuit is connected in parallel with the primary winding P1 of the transformer T1. The primary side of the transformer T1 also includes a primary-side control unit 110 and an FET driving circuit 120, which serve as a control unit for the FET1 and the FET2. A capacitor C1 as a resonant capacitor unit for voltage resonance, connected in parallel with the FET1, is provided for reducing a loss when the FET1 and the FET2 are switched off. A diode D1 is a body diode for the FET1, and a diode D2 is a body diode for the FET2.

The secondary side of the transformer T1 of the switching power supply device 100 includes a diode D11 and a capacitor C11, which serve as a rectifying and smoothing unit for a flyback voltage induced in the secondary winding S1 of the transformer T1. The secondary side of the transformer T1 also includes a feedback circuit 140 (a feedback unit) that feeds back the output voltage Vout to the primary side, and an information transmission circuit 160 that transmits a signal output from a WS terminal of the primary-side control unit 110 to the secondary-side control unit 220.

(Primary-Side Control Unit)

A power supply voltage V2 generated by a DC/DC converter 150 (to be described below) is supplied between a VC terminal and a G terminal of the primary-side control unit 110. Based on a voltage signal output from the feedback circuit 140 and input to an FB (feedback) terminal, the primary-side control unit 110 outputs a control signal DS1 (a driving signal for the FET1) and a control signal DS2 (a driving signal for the FET2) to the FET driving circuit 120. The FET driving circuit 120 controls to turn on and off the FET1 and the FET2 according to the control signals DS1 and DS2 output from the primary-side control unit 110.

The power supply voltage V1 generated from the forward voltage induced in the auxiliary winding P2 of the transformer T1 is divided by resistors R3 and R4 (a voltage detection unit) and input to a VS terminal of the primary-side control unit 110. Based on the voltage input to the VS terminal, the primary-side control unit 110 detects the input voltage Vin accumulated in the smoothing capacitor C3. Although the AC voltage input from the AC power source 10 is detected from the voltage input to the VS terminal in this embodiment, the AC voltage may be detected in other manners. For example, the AC voltage may be detected using resistor voltage-dividing to directly detect the voltage Vin of the smoothing capacitor C3, or to directly detect an input AC voltage ACin between LIVE and NEUTRAL lines to which the voltage from the AC power source 10 is supplied.

An I terminal of the primary-side control unit 110 receives input of the voltage across the current detection resistor R5 averaged by an integrating circuit that includes a resistor R6 and a capacitor C6. Based on the voltage input to the I terminal, the primary-side control unit 110 detects the average of the drain current flowing between the drain terminal and the source terminal of the FET1. The primary-side control unit 110 calculates the power value of the switching power supply device 100 based on the detection information detected on the primary side by the primary-side control unit 110. The primary-side control unit 110 outputs a PWM (Pulse-Width Modulation) signal corresponding to the calculated power value to the WS terminal, thereby transmitting the calculated power information to the secondary side. In this embodiment, the primary-side control unit 110 is implemented using a microcomputer or an ASIC that operates according to clock signals generated by a component such as an oscillator.

(Circuit Operation of Power Supply Device)

The circuit operation of the switching power supply device 100 will now be described. In the switching power supply device 100, the primary-side control unit 110 repeats, through the FET driving circuit 120, control of alternately turning on and off the FET1 (the first switch) and the FET2 (the second switch) with a dead time in between. The current flowing to the inductance of the transformer T1 while the FET1 is ON causes the voltage clamping capacitor C2 to be charged from the transformer T1 through the FET2 or the diode D2. Because the voltage clamping capacitor C2 can absorb a kickback voltage due to the inductance of the transformer T1, a surge voltage applied between the drain terminal and the source terminal of the FET1 can be prevented. As the voltage of the voltage clamping capacitor C2 increases, the diode D11 enters the conduction state to allow power to be supplied to the secondary side of the transformer T1 through the secondary winding S1 of the transformer T1. A resonance operation of the voltage clamping capacitor C2 and the inductance of the transformer T1 causes current to flow from the capacitor C2 to the transformer T1. Thereafter, as the voltage of the voltage clamping capacitor C2 decreases, the diode D11 is turned off to result in no power supplied to the secondary side of the transformer T1. Further, keeping the FET2 ON increases the current flowing from the voltage clamping capacitor C2 to the inductance of the transformer T1. When the FET2 is switched from ON to OFF, the capacitance of the capacitors connected to the primary winding P1 of the transformer T1 decreases from the total capacitance of the voltage clamping capacitor C2 and the voltage resonant capacitor C1 to the capacitance of only the voltage resonant capacitor C1. Consequently, the current flowing to the inductance of the transformer T1 allows the charge in the voltage resonant capacitor C1 to be regenerated for the smoothing capacitor C3. Upon completion of the regeneration operation, the diode D1 enters the conduction state. Turning on the FET1 while the diode D1 is in the conduction state allows the FET1 to perform zero-voltage switching.

The method of controlling the output voltage Vout will now be described. The output voltage Vout on the secondary side of the transformer T1 in the switching power supply device 100 is controlled according to the ON-time ratio between the FET1 and the FET2. That is, as the ON-time ratio of the FET1 to the FET2 increases, the output voltage Vout increases. As a method of controlling the ON-time ratio between the FET1 and the FET2, the primary-side control unit 110 in this embodiment varies the ON-time of the FET1 based on the voltage input to the FB terminal (the feedback information from the feedback circuit 140). Further, if the input voltage Vin is high, the primary-side control unit 110 in this embodiment controls to reduce the ON-time of the FET1, thereby reducing the influence of the input voltage Vin. For example, for a fixed ON-time of the FET1, a doubled input voltage Vin will cause the power supplied to the transformer T1 to be correspondingly doubled. The primary-side control unit 110 therefore controls to correct the ON-time of the FET1. The primary-side control unit 110 also controls to increase the ON-time of the FET2 if the average current value Iave input to the I terminal is large. If the average current value Iave increases while the ON-time of the FET2 remains short, soft switching will not be able to be continued. The primary-side control unit 110 therefore controls to increase the ON-time of the FET2 depending on the average current value Iave. In this manner, the primary-side control unit 110 controls the FET1 and the FET2 based on the results of detecting the input voltage Vin and the average current value Iave, in addition to the feedback information from the feedback circuit 140 (the FB terminal voltage).

The FET driving circuit 120 generates a gate driving signal DL for the FET1 based on the control signal DS1 output from the primary-side control unit 110, and generates a gate driving signal DH for the FET2 based on the control signal DS2 output from the primary-side control unit 110. The power supply voltage V1 is supplied between a VC terminal and a G terminal of the FET driving circuit 120. For driving the FET2, the power supply voltage is supplied between a VH terminal and a GH terminal by a charge pump circuit including a capacitor C5 and a diode D5. If the control signal DS1 goes to high level, the FET driving circuit 120 sets the gate driving signal DL for the FET1 at high level to turn on the FET1. Similarly, if the control signal DS2 goes to high level, the FET driving circuit 120 sets the gate driving signal DH for the FET2 at high level to turn on the FET2.

The DC/DC converter 150 may be a three-terminal regulator or a step-down switching power supply. The DC/DC converter 150 generates the power supply voltage V2 from the power supply voltage V1 input between a VC terminal and a G terminal of the DC/DC converter 150 and outputs the power supply voltage V2 to an OUT terminal. A start-up circuit 130 may be a three-terminal regulator or a step-down switching power supply. The start-up circuit 130 generates the power supply voltage V1 from the input voltage Vin input between a VC terminal and a G terminal and outputs the power supply voltage V1 to an OUT terminal. The start-up circuit 130 operates if the power supply voltage V1 generated from the voltage induced in the auxiliary winding P2 is less than or equal to a predetermined voltage value, and is used for supplying the power supply voltage V1 upon start-up of the switching power supply device 100.

(Feedback Circuit)

The feedback circuit 140 is used to transmit (to feed back) information about the output voltage Vout to the primary side for controlling the secondary-side output voltage Vout to be a predetermined voltage. The voltage value of the output voltage Vout is detected based on the output voltage Vout divided by voltage-dividing resistors R52 and R53 and input to a reference terminal REF of a shunt regulator IC5, and on a reference voltage. If the secondary-side output voltage Vout exceeds the predetermined voltage (here, 24 V), the shunt regulator IC5 enters the conduction state to allow current to flow from the cathode terminal K. The secondary-side diode of a photocoupler PC5 then enters the conduction state and passes current through a pull-up resistor R51 to turn on the primary-side transistor of the photocoupler PC5. As a result, a capacitor C8 is discharged, so that the voltage (the feedback voltage) to be input to the FB terminal of the primary-side control unit 110 decreases. By contrast, if the output voltage Vout falls below 24V, the shunt regulator IC5 enters the non-conduction state to prevent current from flowing from the cathode terminal K. Accordingly, no current flows to the secondary-side diode of the photocoupler PC5 through the pull-up resistor R51, and the primary-side transistor of the photocoupler PC5 is turned off. As a result, a charge current flows to the capacitor C8 from the power supply voltage V2 through a resistor R2, so that the voltage to be input to the FB terminal of the primary-side control unit 110 increases. In this manner, by detecting the voltage input to the FB terminal, the primary-side control unit 110 performs the feedback control for controlling the secondary-side output voltage Vout to be the predetermined value.

(Information Transmission Circuit)

The information transmission circuit 160 is a circuit for transmitting the primary-side power information calculated by the primary-side control unit 110 to the secondary side. The primary-side control unit 110 outputs, from the WS terminal, a PWM (Pulse-Width Modulation) signal PS in which the ON-time according to the calculated primary-side power information is set. If the PWM signal PS is ON (at high level), the primary-side diode of a photocoupler PC6 enters the conduction state through a resistor R62. The secondary-side phototransistor of the photocoupler PC6 is turned on, so that an FET6 is turned off. By contrast, if the PWM signal PS is OFF (at low level), the primary-side diode of the photocoupler PC6 enters the non-conduction state. The secondary-side phototransistor of the photocoupler PC6 is turned off, so that the power supply voltage V2 turns on the FET6 through resistors R61 and R63. Resistors R64 and R65 and a capacitor C61 voltage-converts the PWM signal PS output from the WS terminal. The resulting voltage signal, a DC voltage PD, is input to the secondary-side control unit 220 in the fixing control circuit 102.

(Fixing Control Circuit)

The fixing device 200 and the fixing control circuit 102 will now be described. Power supply to a heat generation member RH1 (also referred to as a heater) in the fixing device 200 is controlled by the fixing control circuit 102. Resistors R9 and R10 in the fixing control circuit 102 are resistors for driving a bidirectional thyristor (hereinafter referred to as a triac) Q5, and a phototriac coupler SSR1 is a device for ensuring the creepage distance between the primary side and the secondary side. Bringing the secondary-side light-emitting diode of the phototriac coupler SSR1 into the conduction state causes the primary-side phototriac of the SSR1 to enter the conduction state. This brings the triac Q5 into the conduction state. The triac Q5, once entering the conduction state, remains ON (the conduction state) until the triac Q5 turns off at a zero-crossing point, at which the AC voltage supplied from the AC power source 10 becomes 0 V. The secondary-side light-emitting diode of the phototriac coupler SSR1 switches between the conduction state and the non-conduction state according to turning on and off a transistor Q4. A resistor R8 is a pull-up resistor, and resistors R16 and R17 are resistors for driving the transistor Q4. The transistor Q4 operates according to a Drive signal output from the secondary-side control unit 220, such that the transistor Q4 is turned on by a high-level Drive signal and turned off by a low-level Drive signal.

The temperature of the heat generation member RH1 in the fixing device 200 is detected by a thermistor TH1. A power supply voltage Vc divided by the thermistor TH1 and a resistor R11 is input as a TH signal to the secondary-side control unit 220. From the input TH signal, the secondary-side control unit 220 detects the temperature of the heat generation member RH1 in the fixing device 200. Based on the temperature detected by the thermistor TH1 and a set temperature for the heat generation member RH1 in the fixing device 200, the secondary-side control unit 220 calculates a power Duty (also referred to as a control Duty) to be supplied to the heat generation member RH1, for example using PID control. The secondary-side control unit 220 further converts the power Duty to a control level such as a phase angle (in the case of phase control) or a wave number (in the case of wave-number control) corresponding to the power Duty to be supplied, and outputs a Drive signal to turn on or off the transistor Q4 according to the control conditions. According to turning on and off the transistor Q4, the triac Q5 (a switch unit) is turned on and off. Turning on the triac Q5 causes the AC power source 10 to be connected with the heat generation member RH1, so that power is supplied from the AC power source 10 to the heat generation member RH1. By contrast, turning off the triac Q5 causes the AC power source 10 to be disconnected from the heat generation member RH1, so that power supply from the AC power source 10 to the heat generation member RH1 is cut off. In this embodiment, the secondary-side control unit 220 is implemented using a microcomputer or an ASIC that operates according to clock signals generated by a component such as an oscillator.

[Power Control by Secondary-Side Control Unit]

The method will now be described in which the secondary-side control unit 220 controls the effective value of the current supplied to the entire image forming apparatus 1 to be less than or equal to a predetermined value based on the power information detected on the primary side and transmitted from the primary-side control unit 110 through the information transmission circuit 160. First, how the primary-side control unit 110 calculates the power of the switching power supply device 100 will be described. The primary-side control unit 110 calculates the power of the switching power supply device 100 based on the input voltage Vin (the detection information detected based on the voltage input from the VS terminal) and the average current value Iave of the drain current of the FET1 input from the I terminal. The power Wd of the switching power supply device 100 can be obtained with Equation (1) below.

$$Wd = Vin \times Iave \tag{1}$$

For example, the primary-side control unit 110 may transmit the power information about the switching power supply device 100 calculated with Equation (1) to the secondary-side control unit 220 through the information transmission circuit 160. This allows the secondary-side control unit 220 to obtain the power information about the switching power supply device 100. The secondary-side control unit 220 can reduce the power value suppliable to the fixing device 200 if the power of the switching power supply device 100 is high, or increase the power value suppliable to the fixing device 200 if the power of the switching power supply device 100 is low. The secondary-side control unit 220 can thus control the effective value of the current supplied to the entire image forming apparatus 1 to be less than or equal to a predetermined value.

In this embodiment, for more accurate control of power supply to the fixing device 200, the effective value of the current supplied to the entire image forming apparatus 1 is controlled to be less than or equal to a predetermined value based on the power information about the switching power supply device 100 from the primary-side control unit 110, in the following manner. The primary-side control unit 110 calculates a power limit value MaxDuty (the maximum Duty) suppliable to the fixing device 200. Here, the method of calculating the power limit value MaxDuty and the method of transmitting the power limit value MaxDuty to the secondary-side control unit 220 will be described.

First, the method of calculating the power limit value MaxDuty suppliable to the fixing device 200 will be described. Here, Wt denotes the power value supplied to the fixing device 200, and Ia denotes the effective value of the total current supplied to the entire image forming apparatus 1, i.e., the effective value of the combined current of the current supplied to the switching power supply device 100 and the current supplied to the fixing device 200. Further, letting λ denote the lower limit value of the power factor with respect to the waveforms of the current and voltage supplied to the entire image forming apparatus 1, the effective value Ia of the total current can be obtained with Equation (2) below.

$$Ia = \frac{(Wt + Wd)}{\left(\lambda \times Vin / \sqrt{2}\right)} \quad (2)$$

Equation (2) can be modified into Equation (3) below, with which the upper-limit of the power value, Wtmax, of the power value, Wt, supplied to the fixing device 200 can be calculated so that the effective value Ia of the total current becomes a predetermined upper-limit effective current value (15 A here, which is the rated current value).

$$Wtmax = \frac{(Vin \times Ia \times \lambda)}{\sqrt{2}} - Wd \quad (3)$$

If the secondary-side control unit 220 controls the triac Q5 at a conduction angle of 100% (in the case of phase control), the primary-side control unit 110 can calculate, as follows, the maximum power value, Wtfull, suppliable to the heat generation member RH1. Rmin denotes the lower-limit resistance value of the heat generation member RH1 stored in the primary-side control unit 110. The primary-side control unit 110 can obtain the estimate of the maximum power value, Wtfull, suppliable to the heat generation member RH1 with Equation (4) below.

$$Wtfull = \frac{Vin^2}{Rmin} \times \frac{1}{2} \quad (4)$$

With Equation (5) below, the primary-side control unit 110 can obtain the power limit value MaxDuty suppliable to the fixing device 200 using the upper-limit power value, Wtmax, and the maximum power value, Wtfull, of the fixing power Wt.

$$MaxDuty = \frac{Wtmax}{Wtfull} \times 100 \quad (5)$$

In this manner, from the detection results detected on the primary side (the input voltage Vin and the average current value Iave), the primary-side control unit 110 calculates the information to be transmitted to the secondary-side control unit 220. This allows the primary-side control unit 110 to integrate the pieces of information to be transmitted to the secondary-side control unit 220 into a single piece of information (in this embodiment, the information about the power limit value MaxDuty). Because the primary-side control unit 110 calculates the power limit value MaxDuty in this embodiment, no separate circuit for calculating the information to be transmitted to the secondary side is needed; there may be only the information transmission circuit 160 for transmitting the information to the secondary-side control unit 220. Thus, based on the information detected on the primary side of the transformer T1 for use in controlling the DC/DC converter, the switching power supply device 100 calculates the information to be transmitted to the secondary-side control unit 220. Consequently, for transmitting the information to the secondary-side control unit 220, the switching power supply device 100 does not need to expand the circuit scale because no separate detection circuit is needed.

Further, for reducing the computational complexity involved in above-described Equations (1) to (5), the primary-side control unit 110 has Table 1 shown below. With Table 1, the power limit value MaxDuty suppliable to the fixing device 200 is acquired based on the average current value Iave of the FET1 and the input voltage Vin. In Table 1, the leftmost column indicates the input voltage Vin and the uppermost row indicates the average current value Iave of the FET1. Each value in Table 1 indicates the power limit value MaxDuty. For example, if the input voltage Vin is 170 V (the effective voltage value of the AC power source 10 is 120 V) and the average current value Iave is 1 A, the power limit value MaxDuty suppliable to the fixing device 200 is 79% according to Table 1. In this manner, the primary-side control unit 110 can refer to Table 1 to readily acquire the calculation result of above-described Equations (1) to (5). For input voltages (e.g., a Vin of 126 V) and switching current values (e.g., 1.25 A) not included in Table 1, linear interpolation may be used to calculate the power limit value MaxDuty according to Table 1.

TABLE 1

| INPUT VOLTAGE | AVERAGE CURRENT VALUE Iave of FET1 (Ia) | | | | |
|---|---|---|---|---|---|
| Vin | 0.5A | 1A | 1.5A | 2A | 2.5A |
| 198 V | 73% | 68% | 64% | 59% | 54% |
| 170 V | 85% | 79% | 74% | 69% | 63% |
| 141 V | 100% | 95% | 89% | 83% | 76% |
| 132 V | 100% | 100% | 96% | 89% | 82% |
| 120 V | 100% | 100% | 100% | 97% | 90% |

Next, the method of transmitting the power limit value MaxDuty from the primary-side control unit 110 to the secondary-side control unit 220 through the information transmission circuit 160 will be described. The primary-side control unit 110 outputs, from the WS terminal, the PWM signal PS of the Duty corresponding to the value of the power limit value MaxDuty acquired by referring to Table 1. When the PWM signal PS is input to the primary-side diode of the photocoupler PC6, the primary-side diode enters the conduction state if the PWM signal PS is at high level. The secondary-side phototransistor is then turned on, so that the FET6 is turned off. By contrast, if the PWM signal PS is at low level, the primary-side diode of the photocoupler PC6 enters the non-conduction state. The secondary-side phototransistor of the photocoupler PC6 is then turned off, so that the FET6 is turned on. The DC voltage PD as a voltage signal is set at low level if the FET6 is ON, and is set at high level if the FET6 is OFF. The DC voltage PD is output to the secondary-side control unit 220. In this manner, the PWM signal is transmitted to the secondary side after being converted into the DC voltage PD proportional to the Duty of the PWM signal PS by the FET6, the resistors R64 and R65, and the capacitor C61. The secondary-side control unit 220 can detect the DC voltage PD (the voltage signal) with an AD converter, thereby acquiring the power limit value MaxDuty.

The information transmission circuit 160 in the switching power supply device 100 may transmit only a single piece of information (the power limit value MaxDuty) to the secondary-side control unit 220. The photocoupler PC6 may therefore be implemented using inexpensive parts having a low response speed.

[Power Supply Control for Fixing Device]

Figure 3:
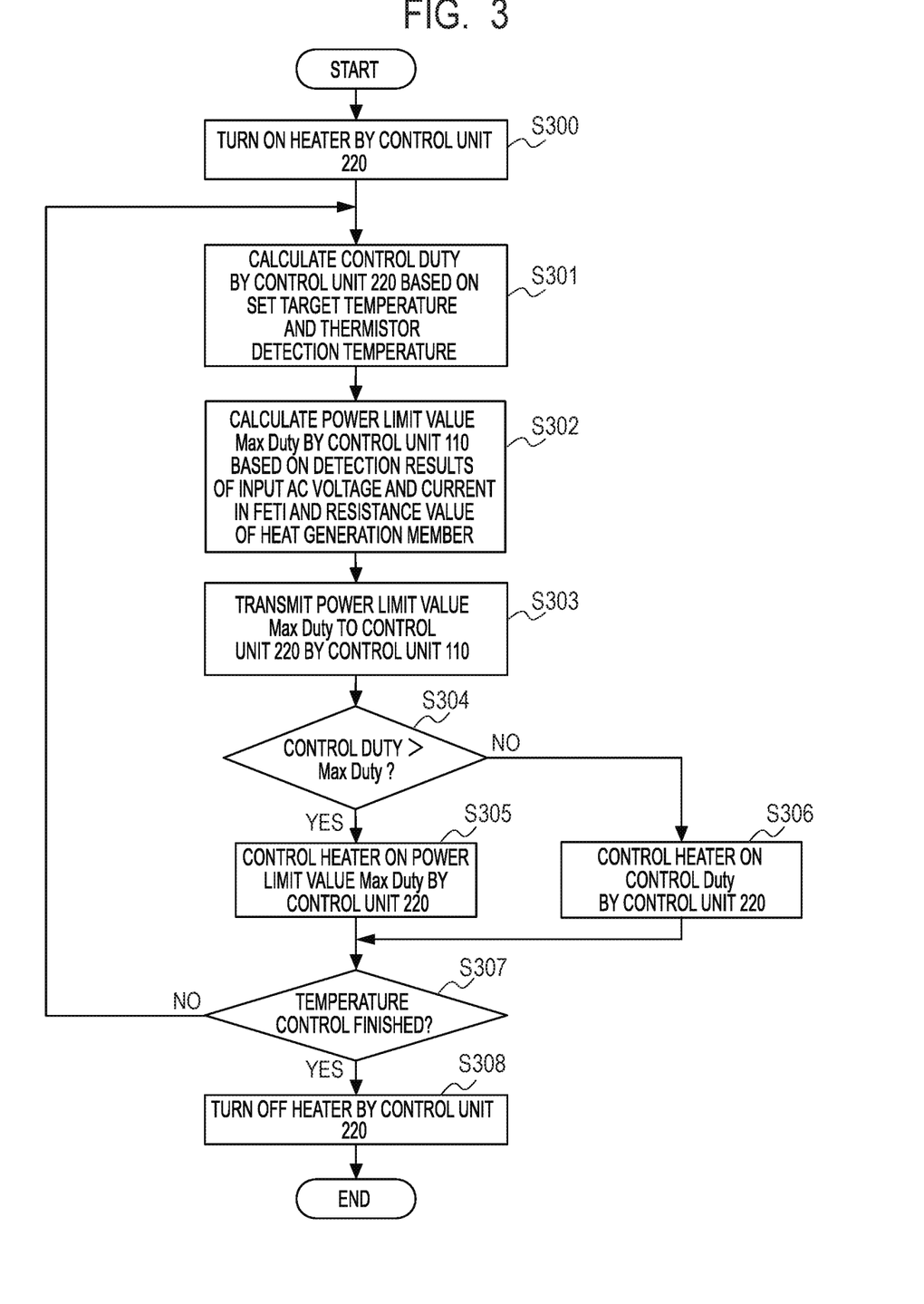
FIG. 3 is a flowchart illustrating the control sequence of power supply to the fixing device in the first embodiment.

FIG. 3 is a flowchart illustrating a control sequence in which the secondary-side control unit 220 controls power supply to the fixing device 200 based on the power information from the primary-side control unit 110. The process shown in FIG. 3 is started when the fixing device 200 performs heating and fixing processing for recording materials, and carried out by the primary-side control unit 110 and the secondary-side control unit 220.

At step (hereinafter denoted as S) 300, the secondary-side control unit 220 controls the Drive signal to start power supply from the AC power source 10 to the heat generation member RH1. At S301, based on the set target temperature and on the temperature detected by the thermistor TH1 and input as the TH signal, the secondary-side control unit 220 calculates the control Duty for performing PID control (the control Duty). At S302, the primary-side control unit 110 calculates the maximum limit value MaxDuty suppliable to the heater RH1. That is, the maximum limit value MaxDuty is calculated from the following information: the voltage information about the AC power source 10 detected based on the voltage input to the VS terminal (the information about the input voltage Vin); the result of detecting the average drain current of the FET1; and the information about the resistance value of the heater RH1 stored in the primary-side control unit 110. At S303, the primary-side control unit 110 transmits the information about the power limit value MaxDuty as the voltage signal PD, which is sent to the secondary-side control unit 220 through the information transmission circuit 160.

At S304, the secondary-side control unit 220 determines whether the control Duty is larger than the power limit value MaxDuty. If it is determined that the control Duty is larger than the power limit value MaxDuty, the secondary-side control unit 220 advances the process to S305. If it is determined that the control Duty is not larger than the power limit value MaxDuty (not larger than the maximum Duty), the secondary-side control unit 220 advances the process to S306. At S305, the secondary-side control unit 220 controls the heater RH1 according to the power limit value MaxDuty. That is, the secondary-side control unit 220 controls the Drive signal so that power is supplied from the AC power source 10 to the heater RH1 according to the power limit value MaxDuty. At S306, the secondary-side control unit 220 controls the heater RH1 according to the control Duty. That is, the secondary-side control unit 220 controls the Drive signal so that power is supplied from the AC power source 10 to the heater RH1 according to the control Duty.

At S307, the secondary-side control unit 220 determines whether the temperature control for heating and fixing for the recording materials in the fixing device 200 is finished. If it is determined that the temperature control is finished, the process is advanced to S308. If it is determined that the temperature control is not finished, the process is returned to S301. At S308, the secondary-side control unit 220 sets the Drive signal at low level to stop power supply to the heat generation member RH1, and terminates the process.

As described above, the switching power supply device 100 in this embodiment has the following features. Based on the detection results detected on the primary side for use in controlling the switching power supply device 100 (the information about the input AC voltage, and the current information about the FET1), the primary-side control unit 110 calculates the information to be transmitted to the secondary side (the power limit value MaxDuty). This eliminates the need to add a current detection circuit or a voltage detection circuit. Because the primary-side control unit 110 integrates the pieces of information to be transmitted to the secondary side into the single piece of information (the power limit value MaxDuty), only the single information may be transmitted to the secondary-side control unit 220. Therefore, a low-speed information transmission circuit may be used. Further, in this embodiment, the primary-side control unit 110 in the switching power supply device 100 is implemented using a control unit (such as a microcomputer, a CPU, or an ASIC) having the capability to calculate power and the capability to transmit information to the secondary side. This eliminates the need to provide a dedicated circuit for power value calculation and information transmission.

Thus, according to this embodiment, the maximum power suppliable to the image heating device can be calculated without an additional current detection circuit or voltage detection circuit. The primary-side control unit controlling the switching power supply device transmits the information for use in controlling the switching power supply device to the secondary-side control unit controlling the image heating device. This allows calculating, without an additional current detection circuit or voltage detection circuit, the maximum power suppliable to the image heating device.

In the first embodiment, the example has been described in which the limit value of the power to be supplied to the heater is transmitted from the primary-side control unit in the switching power supply device to the secondary-side control unit controlling the power for the heater. In a second embodiment, an example will be described in which multiple pieces of information are transmitted from the primary-side control unit in the switching power supply device to the secondary-side control unit, which then calculates the limit value of the power to be supplied to the heater.

[Configuration of Power Supply Device]

Figure 4:
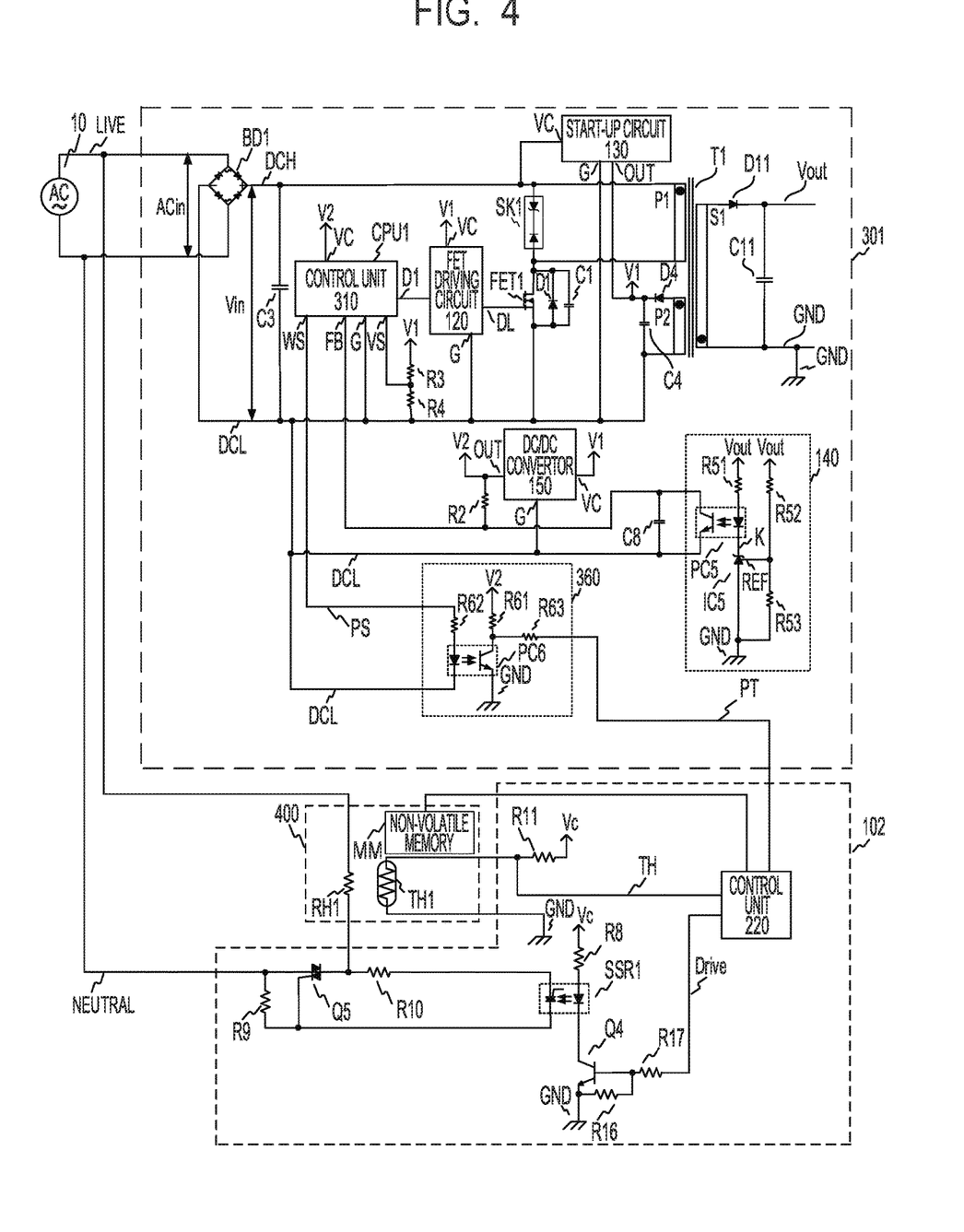
FIG. 4 is a circuit diagram illustrating the circuit configuration in the second and third embodiments, including a switching power supply device, a fixing control circuit, and a fixing device.

FIG. 4 is a circuit diagram illustrating the circuit configuration in this embodiment including: a power supply device 301 (hereinafter referred to as a switching power supply device 301) that is a flyback-type switching power supply device; a fixing device 400; and the fixing control circuit 102 that controls the fixing device 400 of the image forming apparatus 1. The switching power supply device 301 is an insulating DC/DC converter, in which the input voltage Vin accumulated in the smoothing capacitor C3 is converted into the output voltage Vout and output to the secondary side insulated by the transformer T1. The primary side of the transformer T1 of the switching power supply device 301 includes the FET1 connected in series with the primary winding P1 of the transformer T1, a spark killer SK1 connected in parallel with the primary winding P1 of the transformer T1, and a primary-side control unit 310 that is a control unit for the FET1. The spark killer SK1 is an element for absorbing a surge voltage generated when the FET1 is turned off. In the switching power supply device 301, the spark killer SK1 is used instead of the active clamp circuit (including the FET2 and the voltage-clamping capacitor C2) of the switching power supply device 100 in the first embodiment.

Based on the voltage signal output from the feedback circuit 140 and input to an FB terminal, the primary-side control unit 310 outputs a control signal D1 (a driving signal for the FET1) to the FET driving circuit 120. The FET driving circuit 120 controls to turn on and off the FET1 according to the control signal D1 output from the primary-side control unit 310. As in the first embodiment, the switching power supply device 301 in this embodiment controls the FET1 using PWM (Pulse-Width Modulation) control. In this embodiment, the primary-side control unit 310 turns on and off the FET1 in a fixed cycle, and controls the ON-time Duty of the FET1 based on the terminal voltage input to the FB terminal.

The primary-side control unit 310 checks for an abnormal voltage state of the AC power source 10 based on a voltage detected at a VS terminal. If the voltage of the AC power source 10 is abnormally low, continuing the switching operations by the switching power supply device 301 may cause a failure of the switching power supply device 301. Therefore, if the information detected at the VS terminal indicates an abnormally low voltage of the AC power source 10, the switching operations of the FET1 are stopped to protect the switching power supply device 301.

The switching power supply device 301 includes an information transmission circuit 360 that transmits, to the secondary-side control unit 220, a serial communication signal (such as a UART signal) output from a WS terminal of the primary-side control unit 310. The information transmission circuit 360 in this embodiment has a configuration such that the voltage conversion circuit including the FETE, the resistors R64 and R65, and the capacitor C61 is removed from the information transmission circuit 160 shown in FIG. 2 in the first embodiment. The serial communication signal PS output from the WS terminal of the primary-side control unit 310 is converted into a voltage signal PT and output to the secondary-side control unit 220 in the fixing control circuit 102. In the switching power supply device 301, the information transmission circuit 360 is capable of serial communication because of the need to transmit multiple pieces of information to the secondary-side control unit 220.

The fixing device 400 shown in FIG. 4 is different from the fixing device 200 shown in FIG. 2 in the first embodiment in that a nonvolatile memory MM is provided. The nonvolatile memory MM is a memory unit that stores information about the resistance value of the heat generation member (heater) RH1. The information about the resistance value of the heat generation member RH1 is written in the nonvolatile memory MM before shipment from the factory. The secondary-side control unit 220 in the fixing control circuit 102 can therefore acquire the information about the resistance value of the heat generation member RH1 from the nonvolatile memory MM. In the above-described first embodiment, obtaining the maximum power value, Wtfull, suppliable to the heat generation member RH1 involves determining the estimate of the maximum power value, Wtfull, using the lower-limit resistance value Rmin of the heat generation member RH1 stored in the primary-side control unit 110. In this embodiment, a more accurate maximum power value, Wtfull, can be obtained by referring to the information about the resistance value of the heat generation member RH1, stored in the nonvolatile memory MM during the manufacturing of the fixing device 400. Referring to the information about the resistance value of the heat generation member RH1 stored in the fixing device 400 may also be adopted into the switching power supply device 100 in the first embodiment by allowing communication between the primary-side control unit 110 and the nonvolatile memory MM.

In the switching power supply device 301, the fixing control circuit 102, and the fixing device 400 shown in FIG. 4, the same circuit components as in the switching power supply device 100, the fixing control circuit 102, and the fixing device 200 shown in FIG. 2 in the first embodiment are labeled the same symbols and will not be described here.

[Power Control by Secondary-Side Control Unit]

The method will now be described in which the secondary-side control unit 220 controls the effective value of the current supplied to the entire image forming apparatus 1 to be less than or equal to a predetermined value based on the information detected by the primary-side control unit 310 on the primary side and based on the information acquired by the secondary-side control unit 220 on the secondary side. First, the method of calculating the power of the switching power supply device 301 will be described. In this embodiment, the primary-side control unit 310 calculates the power of the switching power supply device 301 based on the input voltage Vin detected from the voltage input to the VS terminal and on the control state of the switching power supply device 301. The control state of the switching power supply device 301 here refers to the ON-time Duty of the FET1. In a current discontinuous mode, the power Wd2 of the switching power supply device 301 can be obtained with Equation (6) below.

$$Wd2 = \frac{1}{2L} \times Vin^2 \times Duty^2 \div f \quad (6)$$

In Equation (6), f denotes the control frequency (the switching frequency) of the switching power supply device 301 for the FET1, and L denotes the inductance of the transformer T1.

The control frequency f, which is the switching frequency of the switching power supply device 301 for the FET1, is a fixed value (a fixed frequency) because the FET1 is turned on and off in a fixed cycle. The ON-time Duty of the FET1 is a value controlled by the primary-side control unit 310. Therefore, no separate circuit for detecting the ON-time Duty of the FET1 is required. In the first embodiment, the power Wd of the switching power supply device 100 is calculated with Equation (1) using the input voltage Vin and the average current value Iave of the drain current of the FET1. By contrast, in the second embodiment, calculating the power Wd2 of the switching power supply device 100 does not require the average current value Iave. This eliminates the need to provide a circuit for detecting the current value. The switching power supply device 301 in this embodiment can calculate the power of the switching power supply device 301 given the control frequency f and the ON-time of the FET1, and the input voltage Vin. In Equation (6), the power of the switching power supply device 301 is calculated by obtaining the ON-time of the FET1 from the ON-time Duty of the FET1, because the control frequency f is a fixed value. Because the ON-time of the FET1 can be calculated from the OFF-time of the FET1 and the control frequency f, the information to be transmitted to the secondary-side control unit 220 may be either the ON-time or the OFF-time of the FET1, instead of the ON-time Duty of the FET1.

In this manner, the control state of the switching power supply device 301 may include the control frequency f (in the case of a power supply with a variable control frequency), the ON-time of the FET1, the OFF-time of the FET1, and the ON-time Duty of the FET1. In this embodiment, the information about the input voltage Vin and the information about the ON-time Duty of the FET (Duty information) are transmitted from the primary-side control unit 310 to the secondary-side control unit 220, which then calculates the power of the switching power supply device 301 with Equation (6). It is assumed that memory (not shown) in the secondary-side control unit 220 contains the control frequency f of the FET1 and the inductance value L of the transformer T1.

Next, the method of transmitting the information about the input voltage Vin and the information about the ON-time Duty of the FET1 from the primary-side control unit 310 to the secondary-side control unit 220 through the information transmission circuit 360 will be described. The primary-side control unit 310 outputs, from the WS terminal, the serial communication signal PS corresponding to the information about the input voltage Vin and to the information about the ON-time Duty of the FET1. When the serial communication signal PS is input to the primary-side diode of the photocoupler PC6, the primary-side diode enters the conduction state if the serial communication signal PS is at high level. The secondary-side phototransistor is then turned on, so that the DC voltage PT as the voltage signal goes to low level. By contrast, if the serial communication signal PS is at low level, the primary-side diode of the photocoupler PC6 enters the non-conduction state. The secondary-side phototransistor of the photocoupler PC6 is then turned off, so that the DC voltage PT goes to high level. In this manner, the secondary-side control unit 220 receives a low-level DC voltage PT if the serial communication signal PS is at high level, and receives a high-level DC voltage PT if the serial communication signal PS is at low level. When the information about the input voltage Vin is transmitted to the secondary-side control unit 220, the primary-side control unit 310 first transmits ID information for the information transmission, and then transmits the information about the input voltage Vin.

Similarly, when the information about the ON-time Duty of the FET1 is transmitted to the secondary-side control unit 220, the primary-side control unit 310 first transmits ID information for the information transmission, and then transmits the information about the ON-time Duty of the FET1. The signal cycle of the signal PS is predetermined. The transmission of the multiple pieces of information through the single information transmission circuit may be realized in other manners than serial communication, for example frequency superposing. Because the primary-side control unit 310 in the switching power supply device 301 in this embodiment is implemented using a unit such as a microcomputer or an ASIC, no separate circuit for transmitting the multiple pieces of information is required. This enables reducing the circuit scale and cost of the switching power supply device 301.

Next, how the secondary-side control unit 220 controls the effective value of the current supplied to the entire image forming apparatus 1 to be less than or equal to a predetermined value will be described. In this embodiment, based on the information about the resistance value of the heat generation member RH1 acquired by the secondary-side control unit 220 from the nonvolatile memory MM, the maximum power value, Wtfull, can be calculated without being affected by the manufacturing variation of the heat generation member RH1. It is assumed that the secondary-side control unit 220 controls the triac Q5 at a conduction angle of 100% (in the case of phase control). Wt2full denotes the maximum power value suppliable to the heat generation member RH1 in this embodiment, and Rm denotes the resistance value of the heat generation member RH1 stored in the nonvolatile memory MM. The maximum power value, Wt2full, can be calculated with Equation (7) below.

$$Wt2full = \frac{Vin^2}{Rm} \times \frac{1}{2} \qquad (7)$$

As described in the first embodiment, the power limit value MaxDuty suppliable to the fixing device 200 can be obtained with Equation (5) using the upper-limit power value, Wtmax, and the maximum power value, Wtfull, of the fixing power Wt. Then, Equation (5) may be used to calculate the upper-limit power value, Wt2max, of the fixing power Wt in this embodiment. The upper-limit power value, Wt2max, can be calculated with Equation (3) described in the first embodiment. That is, as the input voltage Vin in Equation (3), the information about the input voltage Vin transmitted from the primary-side control unit 310 is used. The rated current value, 15 A (amperes), is assigned to the total effective current value Ia. Further, as the lower limit value λ of the power factor with respect to the voltage waveform, a value preset in the secondary-side control unit 220 is used. As the power Wd, the power Wd2 of the switching power supply device 301 calculated in above-described Equation (6) is used. The upper-limit power value, Wt2max, of the fixing power Wt in the second embodiment can thus be calculated. The maximum power value, Wt2full, calculated with Equation (7) and the upper-limit power value, Wt2max, calculated with Equation (3) can be substituted into Equation (5) to calculate the power limit value MaxDuty of the fixing power Wt in this embodiment. In this manner, the power limit value MaxDuty suppliable to the fixing device 400 can be accurately calculated using the information about the resistance value of the heat generation member RH1 acquired on the secondary side by the secondary-side control unit 220, in addition to the information acquired from the primary-side control unit 310.

[Power Supply Control for Fixing Device]

Figure 5:
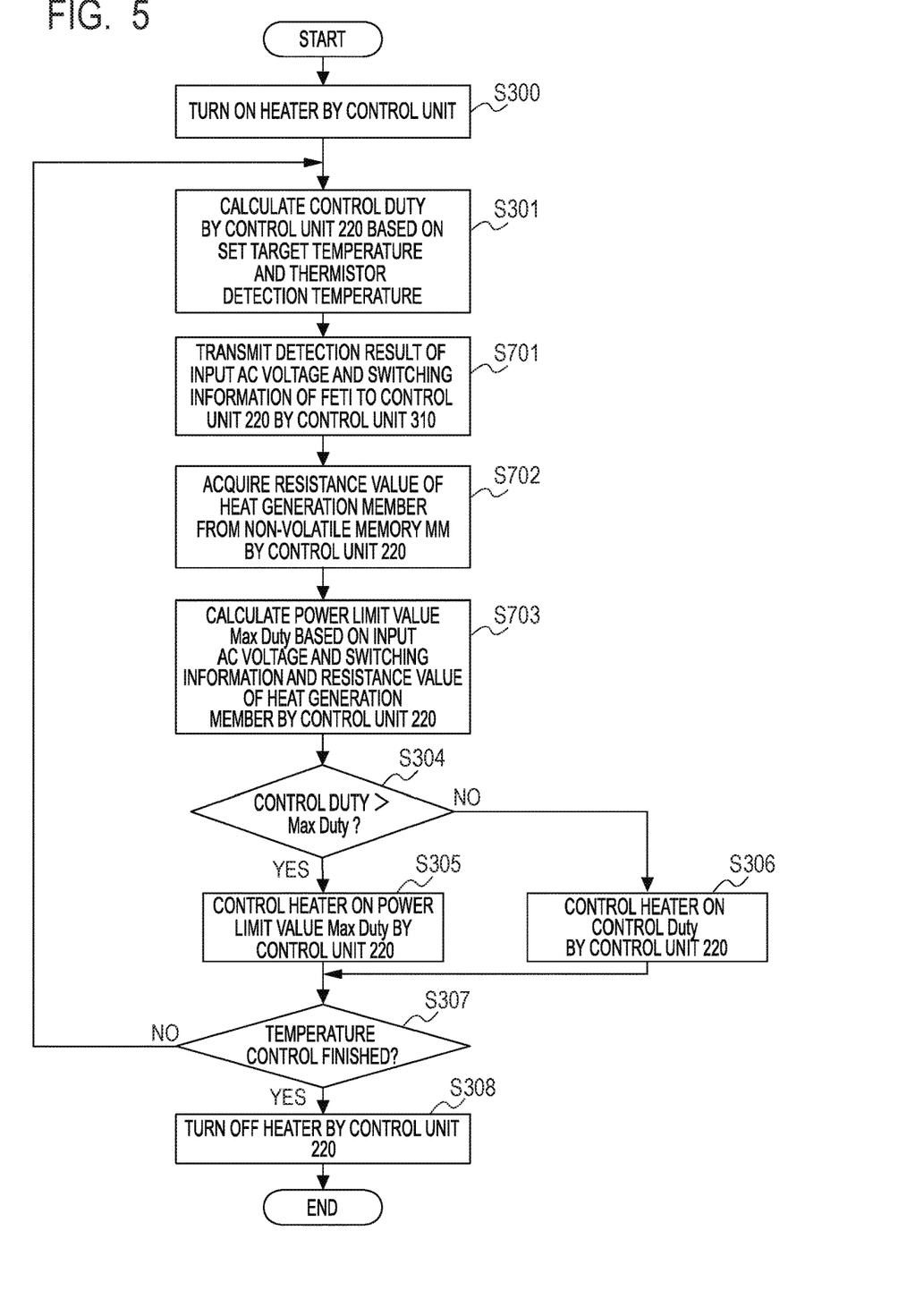
FIG. 5 is a flowchart illustrating the control sequence of power supply to the fixing device in the second embodiment.

FIG. 5 is a flowchart illustrating a control sequence in which the secondary-side control unit 220 controls power supply to the fixing device 400 based on the information from the primary-side control unit 310. The process shown in FIG. 5 is started when the fixing device 400 performs heating and fixing processing for recording materials, and carried out by the primary-side control unit 310 and the secondary-side control unit 220.

Processing at S300 and S301 is the same as the processing at S300 and S301 of FIG. 3 in the first embodiment and therefore will not be described here. At S701, the primary-side control unit 310 transmits, to the secondary-side control unit 220 through the information transmission circuit 360, the voltage information about the AC power source 10 detected based on the voltage input to the VS terminal (the information about the input voltage Vin), and the switching information (the information about the ON-time Duty of the FET1). At S702, the secondary-side control unit 220 acquires the information about the resistance value of the heat generation member RH1 from the nonvolatile memory MM of the fixing device 400. At S703, the secondary-side control unit 220 calculates the power limit value MaxDuty based on the voltage information about the AC power source 10 (the information about the input voltage Vin), the switching information (the information about the ON-time Duty of the FET1), and the information about the resistance value of the heat generation member RH1. Processing at S304 to S308 is the same as the processing at S304 to S308 of FIG. 3 in the first embodiment and therefore will not be described here.

As described above, the image forming apparatus 1 in this embodiment has the following features. The primary-side control unit 310 detects the voltage information about the AC power source 10 by utilizing the output voltage of the auxiliary winding P2 that supplies the power supply voltage V1. This eliminates the need to add a dedicated voltage detection circuit for heater control. Because the VS terminal of the primary-side control unit 310 is used for protection in the case of an abnormally decreased voltage of the AC power source 10, there is no need to add a voltage-detection terminal to the primary-side control unit 310 for heater control. The primary-side control unit 310 controls the FET1, so that no additional circuit for detecting the switching information about the FET1 (such as the cycle, the ON-time, the OFF-time, and the ON-Duty) is needed. The primary-side control unit 310 transmits the voltage information about the AC power source 10 and the switching information about the FET1 to the secondary-side control unit 220. Accordingly, the secondary-side control unit 220 can calculate the power limit value MaxDuty suppliable to the fixing device 400 without an additional current detection circuit or voltage detection circuit.

Thus, according to this embodiment, the maximum power suppliable to the image heating device can be calculated without an additional current detection circuit or voltage detection circuit. The primary-side control unit controlling the switching power supply device transmits the information for use in controlling the switching power supply device to the secondary-side control unit controlling the image heating device. This allows calculating, without an additional current detection circuit or voltage detection circuit, the maximum power suppliable to the image heating device.

In the second embodiment, the switching power supply device 301 has been described that transmits the voltage information about the AC power source 10 and the switching information about the FET1 to the secondary-side control unit 220. In a third embodiment, an example will be described in which the switching power supply device 301 is again used, and rated output information about the switching power supply device 301 is used instead of the switching information about the FET1.

Figure 6:
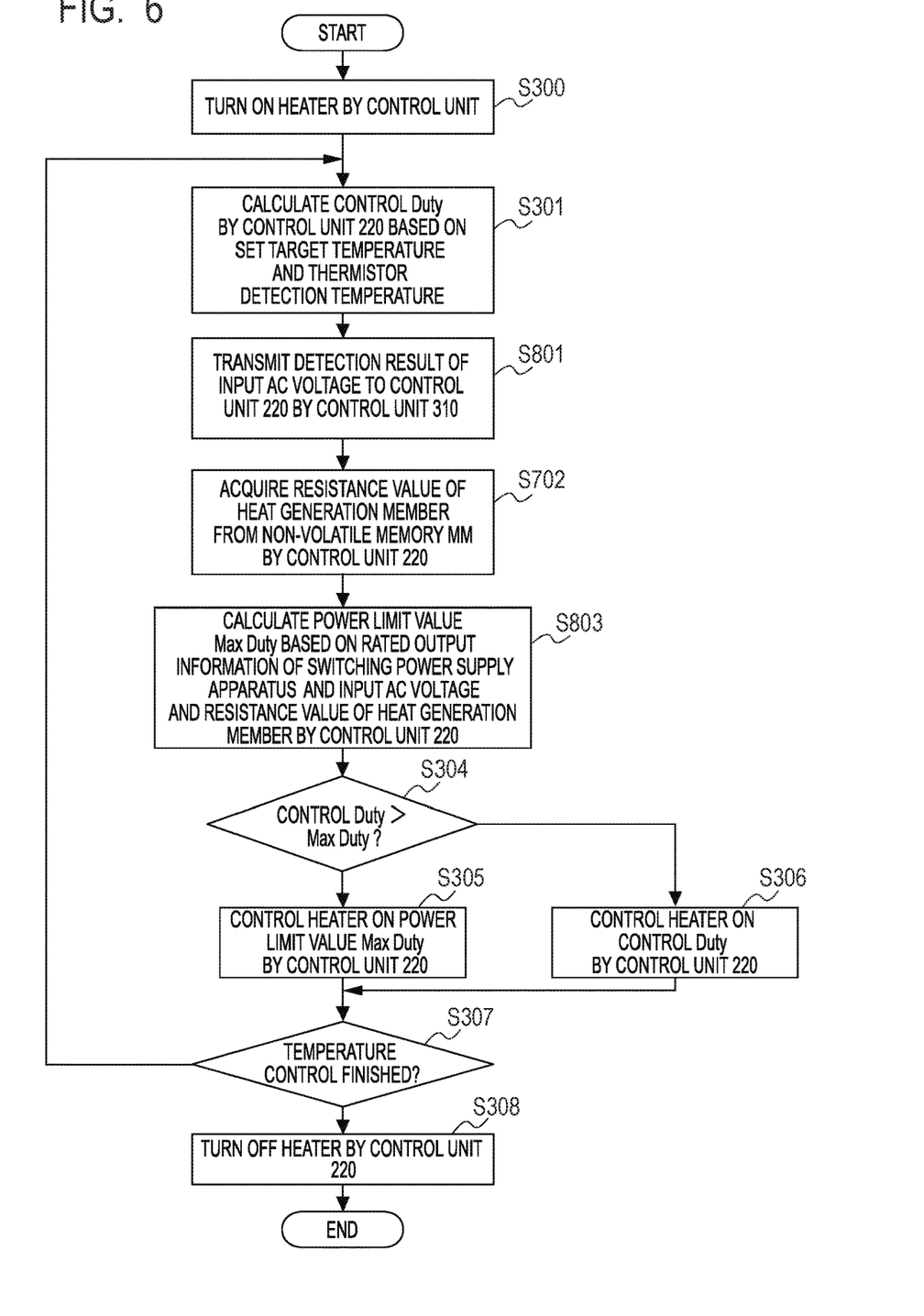
FIG. 6 is a flowchart illustrating the control sequence of power supply to the fixing device in the third embodiment.

A process shown in FIG. 6 is started when the fixing device 400 performs heating and fixing processing for recording materials, and carried out by the primary-side control unit 310 and the secondary-side control unit 220. Processing at S300 and S301 is the same as the processing at S300 and S301 of FIG. 3 in the first embodiment and therefore will not be described here.

At S801, the primary-side control unit 310 transmits, to the secondary-side control unit 220 through the information transmission circuit 360, the voltage information about the AC power source 10 detected based on the voltage input to the VS terminal. The information transmission circuit 360 in the third embodiment may transmit only the single piece of information (the information about the input AC voltage) to the secondary-side control unit 220. The photocoupler PC6 may therefore be implemented using inexpensive parts having a low response speed. For example, the information transmission circuit 160 in the first embodiment may be used instead of the information transmission circuit 360. Processing at S702 is the same as the processing at S702 in FIG. 5 and therefore will not be described.

At S803, the secondary-side control unit 220 calculates the power limit value MaxDuty based on the following information: the information about the input AC voltage (the information about the input voltage Vin); rated output information about the switching power supply device 301 (information about the power consumed while the image forming apparatus 1 performs printing, denoted as Wd2max); and the information about the resistance value of the heat generation member RH1. The rated output information Wd2max about the switching power supply device 301 is a fixed value stored in the memory (not shown) of the secondary-side control unit 220. Equation (6) in the second embodiment for calculating the power Wd2 of the switching power supply device 301 can be replaced with Equation (8) below.

$$Wd2 = Wd2\text{max} \tag{8}$$

Processing at S304 to S308 is the same as the processing at S304 to S308 of FIG. 3 in the first embodiment and therefore will not be described here.

As described above, the image forming apparatus 1 in this embodiment has the following features. The information transmitted by the primary-side control unit 310 to the secondary-side control unit 220 is information detected for use in controlling the switching power supply device 301. This eliminates the need to provide a separate component, such as a detection circuit, for heater control.

Thus, according to this embodiment, the maximum power suppliable to the image heating device can be calculated without an additional current detection circuit or voltage detection circuit. The primary-side control unit controlling the switching power supply device transmits the information for use in controlling the switching power supply device to the secondary-side control unit controlling the image heating device. This allows calculating, without an additional current detection circuit or voltage detection circuit, the maximum power suppliable to the image heating device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-210677, filed Nov. 8, 2018, which is hereby incorporated by reference herein in its entirety.

What is claimed is:

1. An image forming apparatus including a power supply device, the image forming apparatus comprising:
   an image forming unit configured to form an image on a recording material;
   a fixing device including a heater to which power is supplied from an AC power source to generate heat, the fixing device configured to heat the recording material to fix the image onto the recording material;
   a second control unit configured to control a temperature of the heater; and
   a transmission unit configured to transmit information from the power supply device to the second control unit,
   wherein the power supply device comprises:
      a rectifying and smoothing unit configured to rectify and smooth an AC voltage from the AC power source to generate an input voltage;
      a transformer including a primary winding, a secondary winding, and an auxiliary winding;
      a switching unit connected to the primary winding of the transformer, the primary winding configured to receive the input voltage;
      a feedback unit configured to output a feedback voltage according to an output voltage induced in the secondary winding of the transformer;
      a voltage detection unit configured to detect a voltage generated in the auxiliary winding;
      a current detection unit configured to detect a current flowing in the switching unit; and
      a first control unit configured to control switching of the switching unit based on the feedback voltage,
   wherein the first control unit transmits, to the second control unit through the transmission unit, information about a maximum of a power value suppliable to the heater, determined based on the current detected by the current detection unit and the voltage detected by the voltage detection unit, and
   wherein the second control unit controls power supply to the heater according to the information about the maximum acquired through the transmission unit.

2. An image forming apparatus according to claim 1, wherein the switching unit comprises:
   a first switching element connected in series with the primary winding of the transformer;
   a second switching element connected in parallel with the primary winding of the transformer; and
   a capacitor connected in series with the second switching element and connected in parallel with the primary winding of the transformer along with the second switching element,
   wherein the first control unit performs switching operations of alternately turning on and off the first switching element and the second switching element with a dead time between the switching operations, the first switching element and the second switching element being both off during the dead time.

3. An image forming apparatus according to claim 2, wherein the current detection unit detects a current flowing in the first switching element and outputs an average current value of the current detected.

4. An image forming apparatus according to claim 3, wherein the first control unit calculates the information about the maximum based on the power value suppliable to the heater and a maximum power value consumed by the heater.

5. An image forming apparatus according to claim 4,
   wherein the first control unit calculates the power value suppliable to the heater based on a maximum power value suppliable from the AC power source and a power value consumed by the power supply device, and
   wherein the power value consumed by the power supply device is calculated based on the input voltage detected by the voltage detection unit and the average current value detected by the current detection unit.

6. An image forming apparatus according to claim 5, wherein the first control unit calculates the maximum power value consumed by the heater based on the voltage detected by the voltage detection unit and a resistance value of the heater.

7. An image forming apparatus according to claim 6,
   wherein the first control unit includes a memory unit configured to store information, and
   wherein the information stored in the memory unit includes the resistance value of the heater.

8. An image forming apparatus according to claim 1, comprising a switch unit configured to be switched between a connecting state in which power is supplied from the AC power source to the heater and a cut-off state in which power from the AC power source to the heater is cut off,
   wherein the second control unit controls the temperature of the heater by switching the switch unit to one of the connecting state and the cut-off state.

9. An image forming apparatus including a power supply device configured to supply power to a load, the image forming apparatus comprising:
   an image forming unit configured to form an image on a recording material;
   a fixing device including a heater to which power is supplied from an AC power source to generate heat, the fixing device configured to heat the recording material to fix the image onto the recording material;
   a second control unit configured to control a temperature of the heater; and
   a transmission unit configured to transmit information from the power supply device to the second control unit,
   wherein the power supply device comprises:
      a rectifying and smoothing unit configured to rectify and smooth an AC voltage from the AC power source to generate an input voltage;
      a transformer including a primary winding, a secondary winding, and an auxiliary winding;
      a switching unit connected to the primary winding of the transformer, the primary winding configured to receive the input voltage;
      a feedback unit configured to output a feedback voltage according to an output voltage induced in the secondary winding of the transformer;
      a voltage detection unit configured to detect a voltage generated in the auxiliary winding;
      a first control unit configured to control switching of the switching unit based on the feedback voltage,
   wherein the first control unit transmits information about the voltage detected by the voltage detection unit to the second control unit through the transmission unit, and
   wherein the second control unit determines information about a maximum of a power value suppliable to the heater based on the information about the voltage acquired through the transmission unit, and controls power supply to the heater according to the information about the maximum value of the power suppliable to the heater.

10. An image forming apparatus according to claim 9, wherein the switching unit comprises:
a first switching element connected in series with the primary winding of the transformer; and
an element connected in parallel with the primary winding of the transformer, the element configured to absorb a surge voltage generated when the first switching element is turned off,
wherein the first control unit performs switching operations of turning on and off the first switching element at a predetermined frequency.

11. An image forming apparatus according to claim 10, wherein the first control unit further transmits switching information about the switching unit to the second control unit through the transmission unit, and
wherein the second control unit determines the information about the maximum based on the information about the voltage and the switching information.

12. An image forming apparatus according to claim 11, wherein the switching information is duty information about a time during which the first switching element is turned on.

13. An image forming apparatus according to claim 10, wherein the second control unit calculates the information about the maximum of the power value suppliable to the heater based on the power value suppliable to the heater and a maximum power value consumed by the heater.

14. An image forming apparatus according to claim 13, wherein the fixing device includes a memory unit storing a resistance value of the heater, and
wherein the second control unit calculates the maximum power value consumed by the heater based on the resistance value of the heater acquired from the memory unit and the information about the voltage.

15. An image forming apparatus according to claim 13, wherein the second control unit calculates the power value suppliable to the heater based on a maximum power value suppliable from the AC power source and a power value consumed by the power supply device, and
wherein the power value consumed by the power supply device is calculated based on the information about the voltage, duty information about a time during which the first switching element is turned on, and the predetermined frequency at which the first switching element is switched.

16. An image forming apparatus according to claim 9, wherein the second control unit includes a memory unit storing rated output information about the power supply device,
wherein the rated output information about the power supply device is a power value consumed by the power supply device while the image forming apparatus forms an image on a recording material,
wherein the second control unit calculates the information about the maximum of the power value suppliable to the heater based on the information about the voltage and the rated output information.

17. An image forming apparatus according to claim 9, comprising a switch unit configured to be switched between a connecting state in which power is supplied from the AC power source to the heater and a cut-off state in which power from the AC power source to the heater is cut off,
wherein the second control unit controls the temperature of the heater by switching the switch unit to one of the connecting state and the cut-off state.

* * * * *